United States Patent
Sawyer

(10) Patent No.: US 8,300,081 B1
(45) Date of Patent: Oct. 30, 2012

(54) BLENDING VIDEO FEEDS FOR VISUAL COLLABORATION

(75) Inventor: Dave Sawyer, Campbell, CA (US)

(73) Assignee: Adobe Systems Incorporated, San Jose, CA (US)

( * ) Notice: Subject to any disclaimer, the term of this patent is extended or adjusted under 35 U.S.C. 154(b) by 992 days.

(21) Appl. No.: 12/333,167

(22) Filed: Dec. 11, 2008

(51) Int. Cl.
*H04N 7/14* (2006.01)
(52) U.S. Cl. ............... 348/14.08; 348/14.12; 348/14.07
(58) Field of Classification Search .... 348/14.01–14.16, 348/586; 709/204–205
See application file for complete search history.

(56) References Cited

U.S. PATENT DOCUMENTS

| | | |
|---|---|---|
| 2006/0238548 A1 | 10/2006 | Stotts, Jr. et al. |
| 2008/0030621 A1* | 2/2008 | Ciudad et al. ................ 348/586 |
| 2008/0129870 A1 | 6/2008 | Champion et al. |
| 2008/0218582 A1* | 9/2008 | Buckler ..................... 348/14.08 |
| 2009/0033737 A1* | 2/2009 | Goose et al. ............... 348/14.07 |

OTHER PUBLICATIONS

"MyVideoTalk," pp. 1-6 .
Karapetkov, Stefan, "The Future of Visual Communications: Applications For Education and Their Impact on the IT Infrastructure," pp. 1-13.

* cited by examiner

*Primary Examiner* — Melur Ramakrishnaiah
(74) *Attorney, Agent, or Firm* — Kilpatrick Townsend & Stockton LLP

(57) ABSTRACT

Blending of a video feed with a primary feed is described which allows a viewer to focus on a shared computer desktop space represented by a primary feed while also observing the video feed. Primary subject matter is generated from the raw feeds of both the video feed, resulting in a camera feed, and the primary feed to reduce unnecessary portions of the video feed and/or the primary feed. A transparency value of at least one of the camera feed or primary feed is adjusted before the two feeds are blended together in a composite view. By adjusting the transparency level, a more effective visual presentation and user experience is created.

49 Claims, 13 Drawing Sheets

BLENDING VIDEO FEEDS FOR VISUAL COLLABORATION

TECHNICAL FIELD

The present disclosure relates generally to visual communications and, more particularly to providing visual communication which allows a user to view a blended video feed and a primary feed.

BACKGROUND

With recent increases in computing capacity and transmission bandwidth capabilities, video conferencing is quickly becoming a simple and effective means of communication and collaboration. Many corporations and individuals utilize video conferencing systems and visual collaborations to provide low-cost face-to-face meetings between colleagues and friends at various locations. To enhance communications at those meetings, some video conferencing or collaboration systems permit computer generated images or presentations to be simultaneously broadcast in a primary feed to participants either in a pop-up window, a picture-in picture format, or as an alternate switchable display on the video monitors. Lately, enhancements to this have been provided for video conferencing over the Internet that permits the manipulation by distant participants of objects in the primary feed such as computer-generated documents, spreadsheets or drawings displayed as a primary feed in the separate pop-up window.

Despite these enhancements, significant limitations remain present when viewing a shared document. For example, generally when viewing either one or more participants on a video conference along with a primary feed, pictures are displayed in a side by side format, or in separate frames of an overall viewing area (i.e. picture-in-picture format). As a result, while trying to walk through a document with a participant in the conference who is closely focused on text, a speaker cannot simply make an indication and say "look at this paragraph here" because if the participant is looking at a document, the participant cannot see where the speaker is pointing. In the context of a shared desktop, the speaker could use a mouse to point a cursor on a certain area, or could select/highlight the paragraph. However, this causes sudden changes in the document which can be very jarring to a conference participant. Further, the participant will likely miss the facial expressions of the speaker because they are focused on the document. As a result, current systems and methods implementing such concepts fail to provide a user with an optimal viewing experience.

BRIEF SUMMARY

Representative embodiments of the present teachings are directed to systems and methods that blend a video feed with a primary feed in a manner which allows a viewer to focus on a primary feed, while also observing the video feed. A blended visual presentation preferably reduces unnecessary portions of the video feed, primary feed, or both. Further, a transparency value of at least one of the video feed and primary feed is adjusted, thereby providing for an improved visual presentation.

Additional representative embodiments of the present teachings are directed to computer implemented methods that include identifying image data representing at least one reference frame in camera feed data captured by a first camera, subtracting the image data representing the at least one identified reference frame from the camera feed data to be blended with primary feed data representing a shared desktop space for a visual collaboration, adjusting a transparency value of at least one of the camera feed data or the primary feed data, blending the camera feed data with the primary feed data to make a broadcast feed, and transmitting the broadcast feed to at least one computer display.

Still further additional representative embodiments of the present teachings are directed to video conferencing systems that include a local computer configured to receive a video signal from a remote computer, further configured to adjust a transparency level of either a primary feed signal or the video signal, where the primary feed signal represents image data of a desktop displayed on the local computer. The local computer is further configured to blend the video signal with the primary feed signal, wherein the blended signal incorporates one or more primary subjects of the video signal with the primary feed signal.

Further additional representative embodiments of the present teachings are directed to computer implemented methods that include receiving camera feed data from a video source, identifying a key frame image within the camera feed data, transforming the camera feed data by removing the key frame image, receiving primary feed data comprising a visual representation of a shared computer desktop space for a visual collaboration, adjusting a transparency of at least one of the camera feed data or the primary feed data and blending the camera feed data with the primary feed data to create composite broadcast data.

Still further representative embodiments of the present teachings are directed to computer program products having computer readable media with computer program logic recorded thereon. The computer program product includes code for identifying image data representing at least one reference frame in camera feed data captured by a first camera, code for transforming the camera feed data by subtracting the at least one reference frame, code for adjusting a transparency value of at least one of the camera feed data or primary feed data representing a shared desktop space for a visual collaboration, and code for blending the camera feed data with the primary feed data.

Additional representative embodiments of the present teachings are directed to computer implemented methods that include executing instructions on a computing platform so that binary digital electronic signals identify image data representing at least one reference frame in camera feed data captured by a first camera, executing instructions on the computing platform so that binary digital electronic signals transform the camera feed data by subtracting the at least one reference frame, executing instructions on the computing platform so that binary digital electronic signals adjust a transparency value of at least one of: the camera feed data and primary feed data representing a shared desktop space for a visual collaboration, and executing instructions on the computing platform so that binary digital electronic signals blend the camera feed data with the primary feed data.

The foregoing has outlined rather broadly the features and technical advantages of the present teachings in order that the detailed description that follows may be better understood. Additional features and advantages will be described hereinafter which form the subject of the claims. It should be appreciated by those skilled in the art that the conception and specific embodiment disclosed may be readily utilized as a basis for modifying or designing other structures for carrying out the same purposes of the present teachings. It should also be realized by those skilled in the art that such equivalent constructions do not depart from the spirit and scope of the teachings as set forth in the appended claims. The novel features which are believed to be characteristic of the present teachings, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present teachings.

BRIEF DESCRIPTION OF THE DRAWINGS

For a more complete understanding of the present teachings, reference is now made to the following descriptions taken in conjunction with the accompanying drawing, in which.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art.

Figure 1:
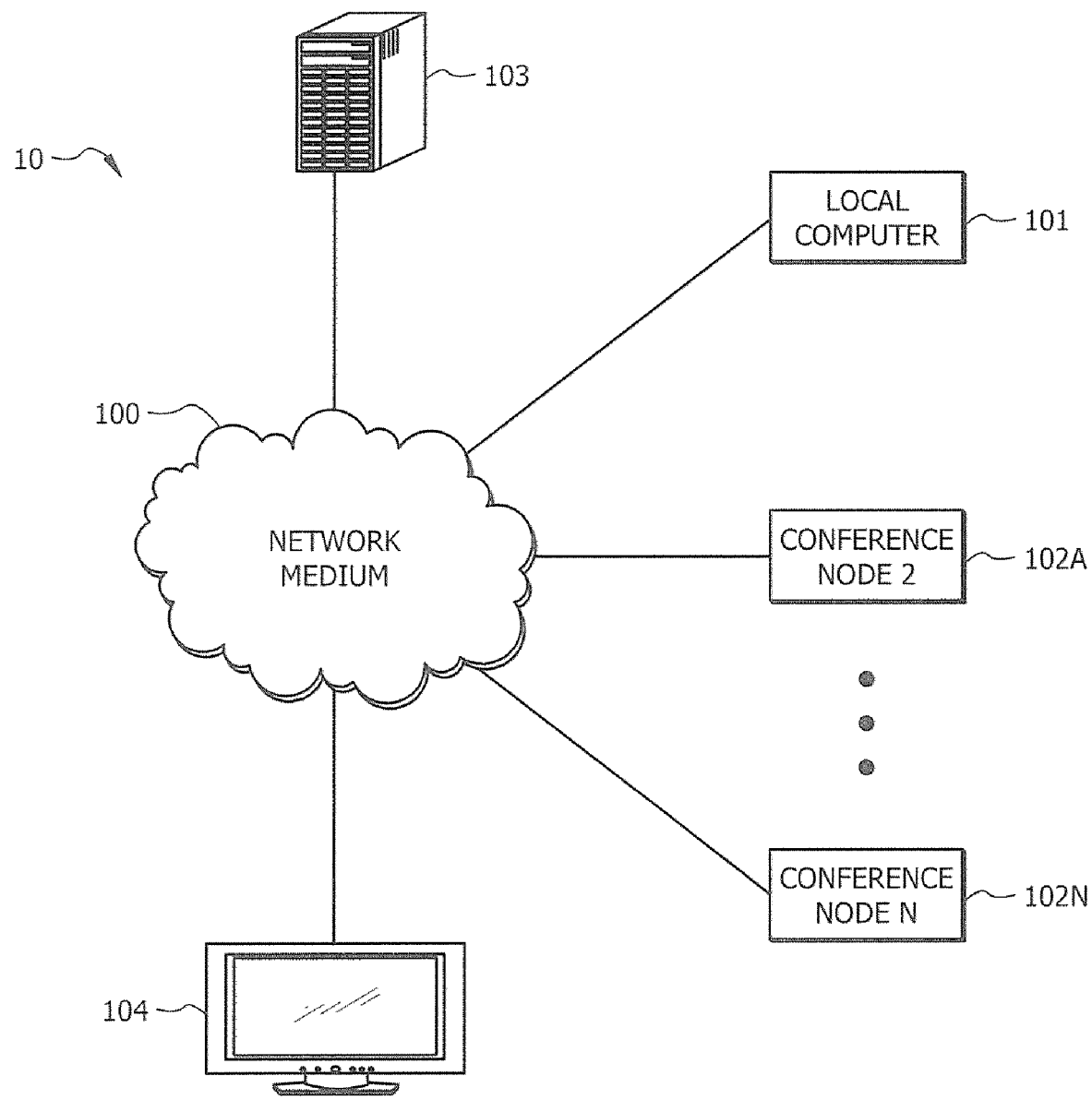
FIG. 1 is a block diagram illustrating a video conferencing system in accordance with an embodiment of the present teachings.

Turning now to FIG. 1, a block diagram is shown illustrating aspects of the present disclosure as applied to embodiments implementing video conferencing system 10. Various components of video conferencing system 10 are connected via network medium 100. Network medium 100 can be any suitable means for conveying one or more video and/or data feeds between locations. For example, network medium 100 may be a local area network, wireless network, an internet connection, cellular communications network, and the like.

Video conferencing system 10 includes local computer 101 which is one of the conference nodes participating in video conferencing system 10. Local computer 101 is configured to receive a video signal either locally or from a remote source. The remote source may be another physical computing device, including but not limited to another conference node, such as nodes 102a-n, remote server 103, or any other alternate video source 104. It is noted that alternate video source 104 may include a television signal, streaming video, video received from a cellular phone, closed circuit broadcast, and the like.

Local computer 101 is configured to blend the image data representing the video signal with image data representing primary feed data, such as a feed from its displayed desktop. Primary feed data can be any other visual presentation or shared space that a user may want to view along with the camera feed. In one embodiment, the primary feed data is a shared space from the user's computer in a video conference. The shared space may be the actual full desktop view of a participant's computer or a shared view of an application from a conferencing server or only a shared portion of the participant's desktop view. The primary feed data could also be an active video feed. Moreover, the primary desktop feed may originate at local computer 101, or may originate from any other source on conferencing system 10. The blended signal is configured to incorporate one or more primary subjects of the video signal with the desktop feed. Local computer 101 may be further configured to adjust the transparency level of at least one of the primary desktop feed and the video signal.

Local computer 101 may be further configured to broadcast the blended signal to other participants in the conference on conference nodes 102a-n, or to remote server 103, over network medium 100. Local computer 101 may also be configured to subtract out image data representing one or more primary subjects of the video signal from the raw image data of the video signal, and/or subtract out image data representing one or more key frames in the primary desktop feed, before blending the signal with the primary desktop feed. In short, local computer 101 may be configured to implement the functionality of the embodiments discussed in the present teachings herein.

Local computer 101 may also act as a conference server, or a separate conference server. Conference server 103 may be used to administer the video conference, blend signals, etc. A conference server may be utilized to switch between, or to simultaneously blend, a plurality of video signals from separate conference users with a primary desktop feed. Switching may be implemented based on the activity occurring within a video conference, such as a participant speaking, an administrator selecting a video signal, and the like.

It should be noted that in additional and/or alternative embodiments of the present teachings, the blending and adjusting of transparency may occur at any of the video conferencing system. For example, at the starting side, or side from which the camera feed video is being captured, the participant's local computer may adjust the transparency of one or more of the feeds, blend the camera feed data with the primary feed data, and then send the composite broadcast feed data out to the other participants or conferencing server. Alternatively, the starting side may broadcast the camera feed data and primary feed data separately, so that each local computer for each participant handles the transparency adjustment and blending operations. Still further, a conferencing server or other intermediate blending server may receive the video feed and the primary feed from the starting side, create the camera feed from the video feed, create the primary feed, adjust the transparency level as desired, blend the camera feed and primary feed, and then either deliver the composite broadcast feed to a conferencing server for broadcasting to the participants, or send the composite broadcast feed to the participants directly.

Figure 2A:
FIGS. 2A-C are illustrations of an example field of view captured by a camera in accordance with an embodiment of the present teachings.
Figure 2B:
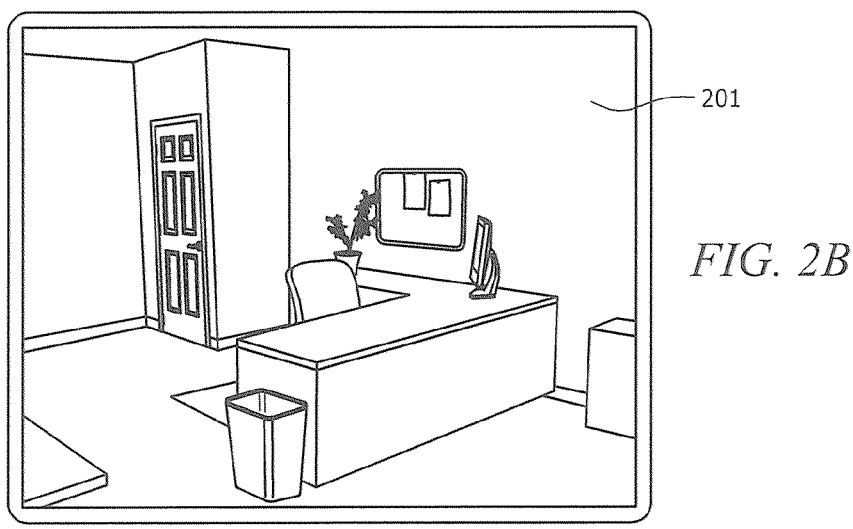
Figure 2C:
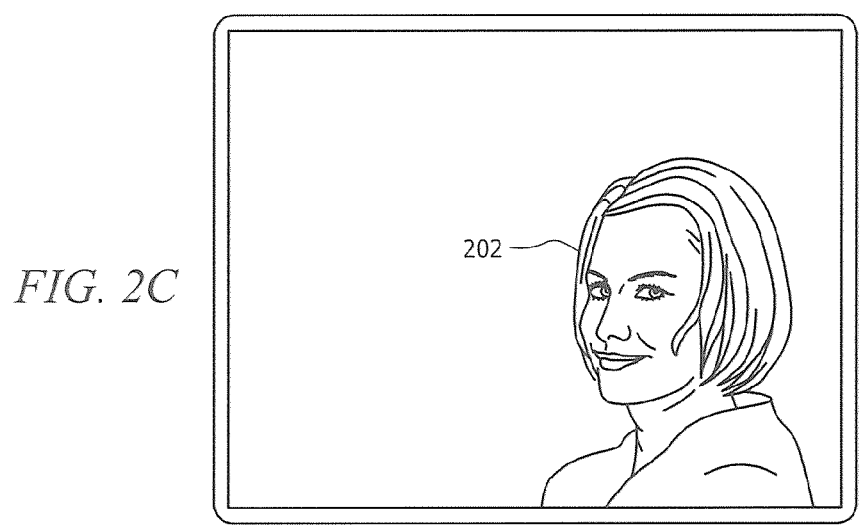

FIG. 2A illustrates field of view 200 captured by a camera (not shown). Field of view 200 comprises both reference frame 201 (also shown in FIG. 2B) and primary subject 202 (also shown in FIG. 2C). While the illustration of FIG. 2A only shows one primary subject, it is noted that embodiments of the present teachings could function with multiple primary subjects in a field of view. Reference frame 201 may be identified using multiple techniques. For example, a camera may capture an image of reference frame 201 while having no primary subjects in the camera's field of view, such as by capturing the frame while the primary subject is temporarily removed from the field of view, or prior to the primary subject's arrival in field of view 200, and the like. This image is then stored in memory of a computing device as a reference for later processing.

Another exemplary technique may involve capturing a series of images where both reference portions 201 and one or more primary subjects 202 are in field of view 200. These images are then processed and reference frame 201 is identified as the portion of the images that do not experience any movement, or that experience minimal movement. In this exemplary technique, it is noted that the reference frame is identified by identifying a primary subject and determining that aspects of an image other than the primary subject, make up the reference frame. When identifying non-moving portions in such camera images, it is further useful to compensate for minor movements, or jitters, which can be caused by actual movements of the camera itself.

Additionally, reference frame 201 may be identified, in total or in part, using manual selection techniques. Manual selection techniques may be implemented on a macro scale, such as by dragging a mouse cursor over a particular area. Additionally, manual selections can be made at a pixel level. Selection techniques may also implement edge detection methods or may analyze gradient magnitudes. Further, embodiments described in the present disclosure may implement the exemplary techniques discussed herein for identifying a reference frame in a camera field of view may be used separately, or in combination with each other.

Figure 3A:
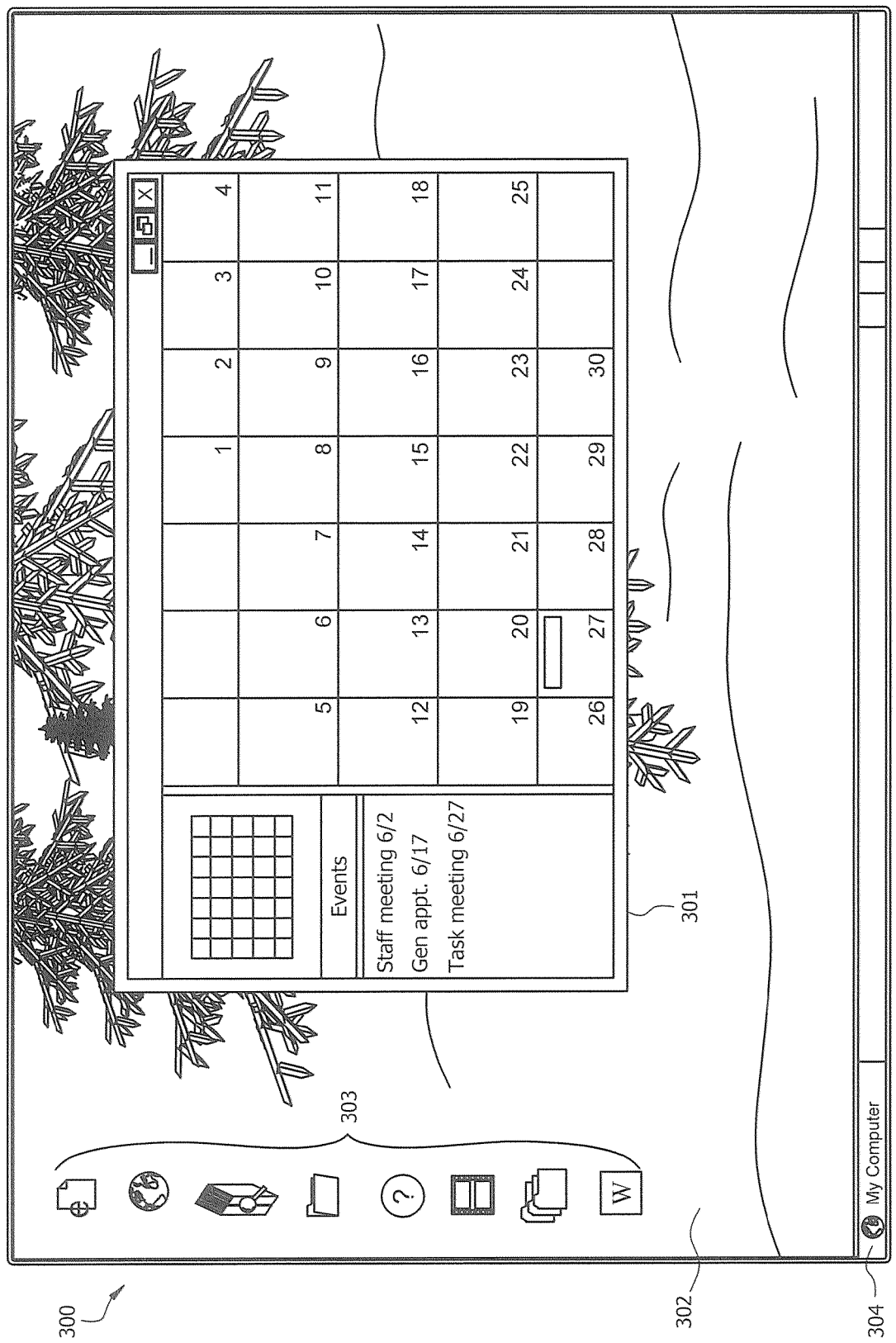
FIGS. 3A-C are illustrations of an example of a visual presentation of a standard desktop computer in accordance with an embodiment of the present teachings.
Figure 3B:
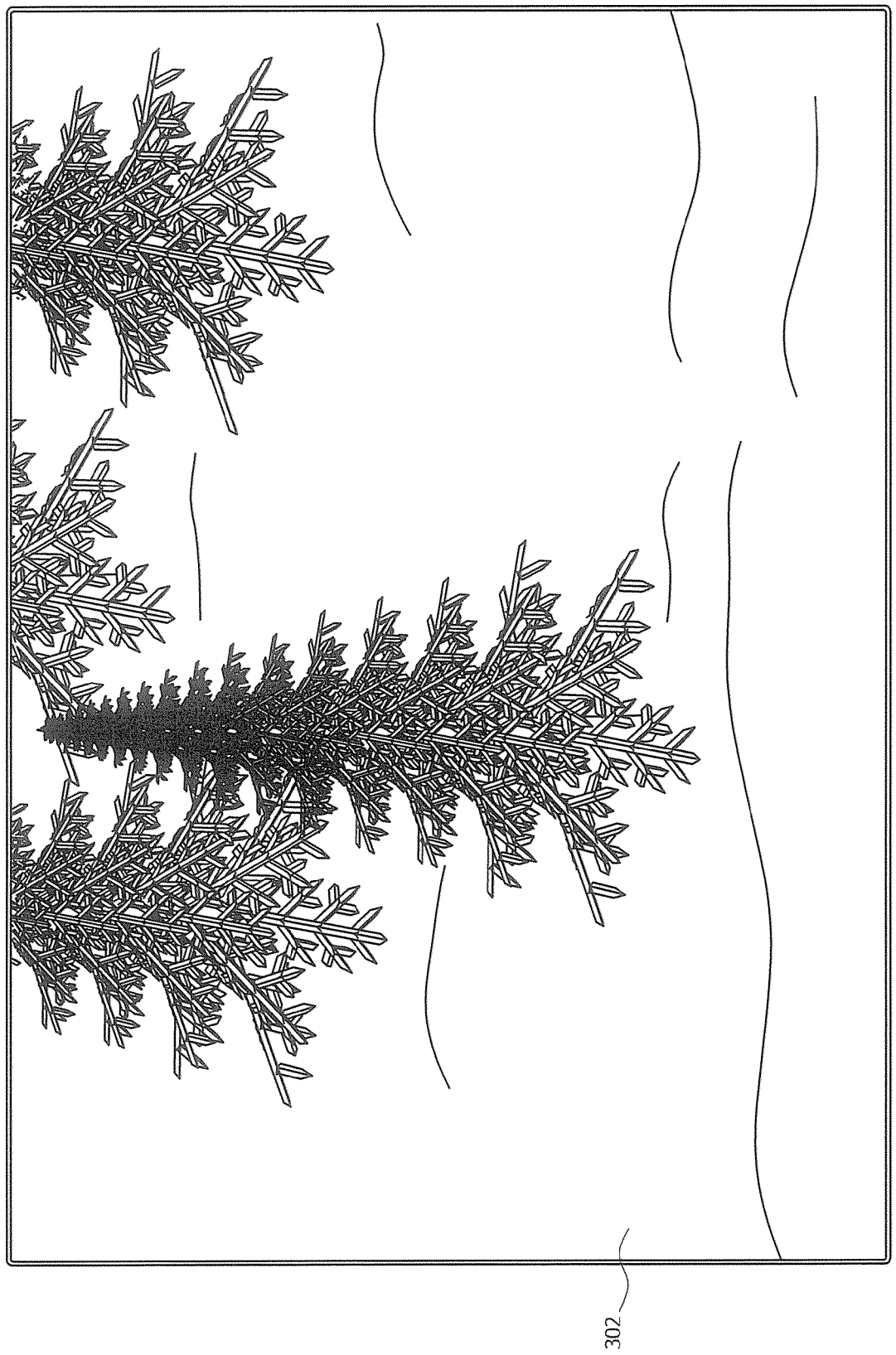
Figure 3C:
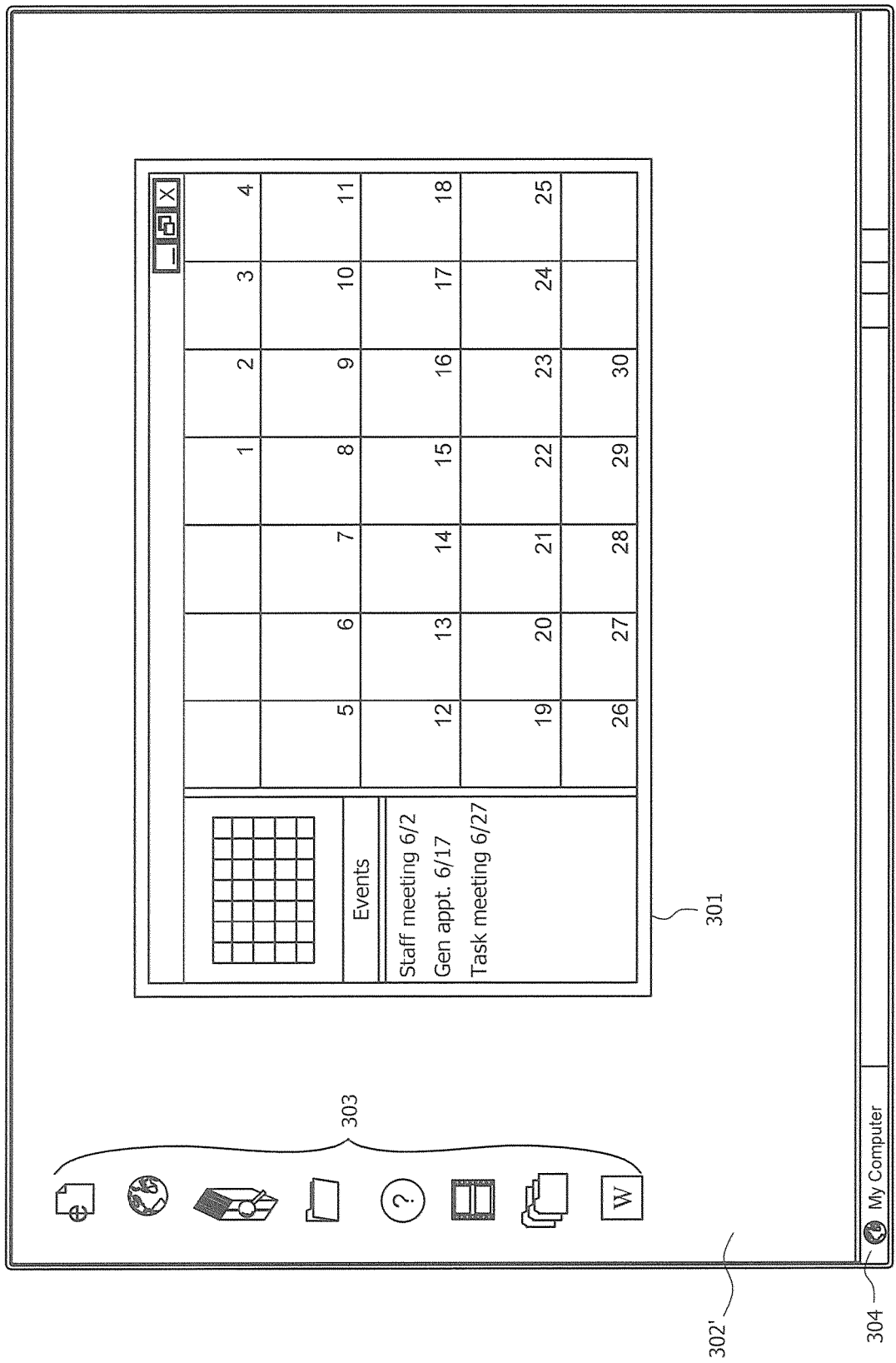

In some embodiments, at least one reference frame may be subtracted from the primary feed. FIGS. 3A-3C illustrate a progressing example of a visual presentation of desktop computer 300. The visual presentation comprises application window 301, background picture 302, and various icons 303 and menus 304. When blending the primary feed with camera feed data captures it may be desirable to minimize the amount of items being displayed with the primary feed. Background picture 302 may be subtracted to display alternate background 302'. Alternate background 302' may be selected as preferred by a user. Alternate background 302' is shown as a solid color. A solid background may be desirable as it assists in making any blended visual presentation easier to view. However, any other background could be selected, as desired by the user.

In some embodiments, one or more of icons 303 and menus 304 may be subtracted from the primary feed. It is noted that icons 303 and menus 304 will generally not create the same viewing noise as would a background picture when viewing a blended camera feed and primary feed. This is mainly because icons 303 and menus 304 are generally small and are usually placed off to the side of the visual presentation of a desktop computer. However, icons 303 and menus 304 may still be subtracted leaving only application window 301 in desktop presentation 300.

Figure 4A:
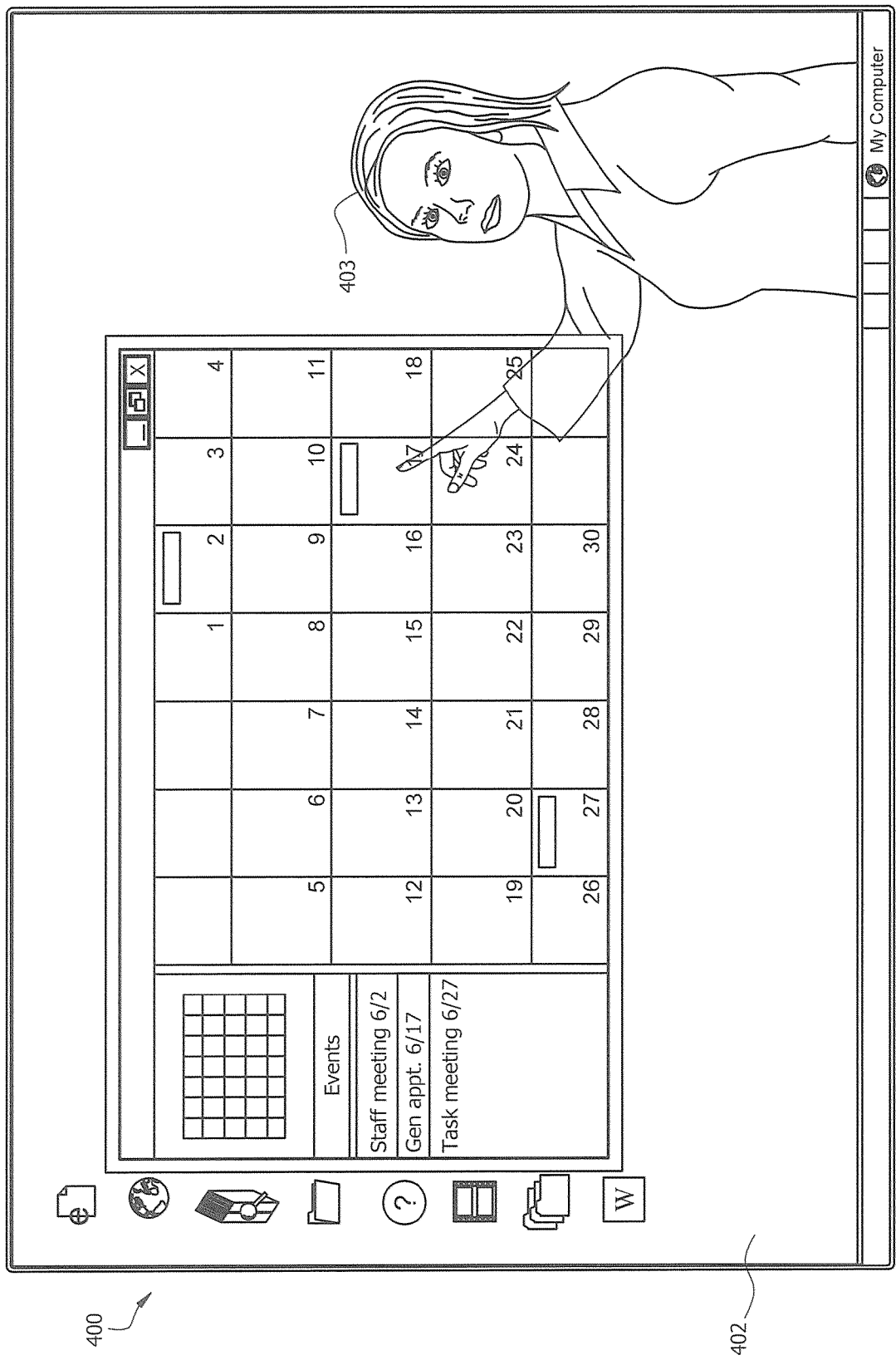
FIG. 4A is an illustration of a blended view of a camera feed and primary feed in accordance with an embodiment of the present teachings.
Figure 4B:
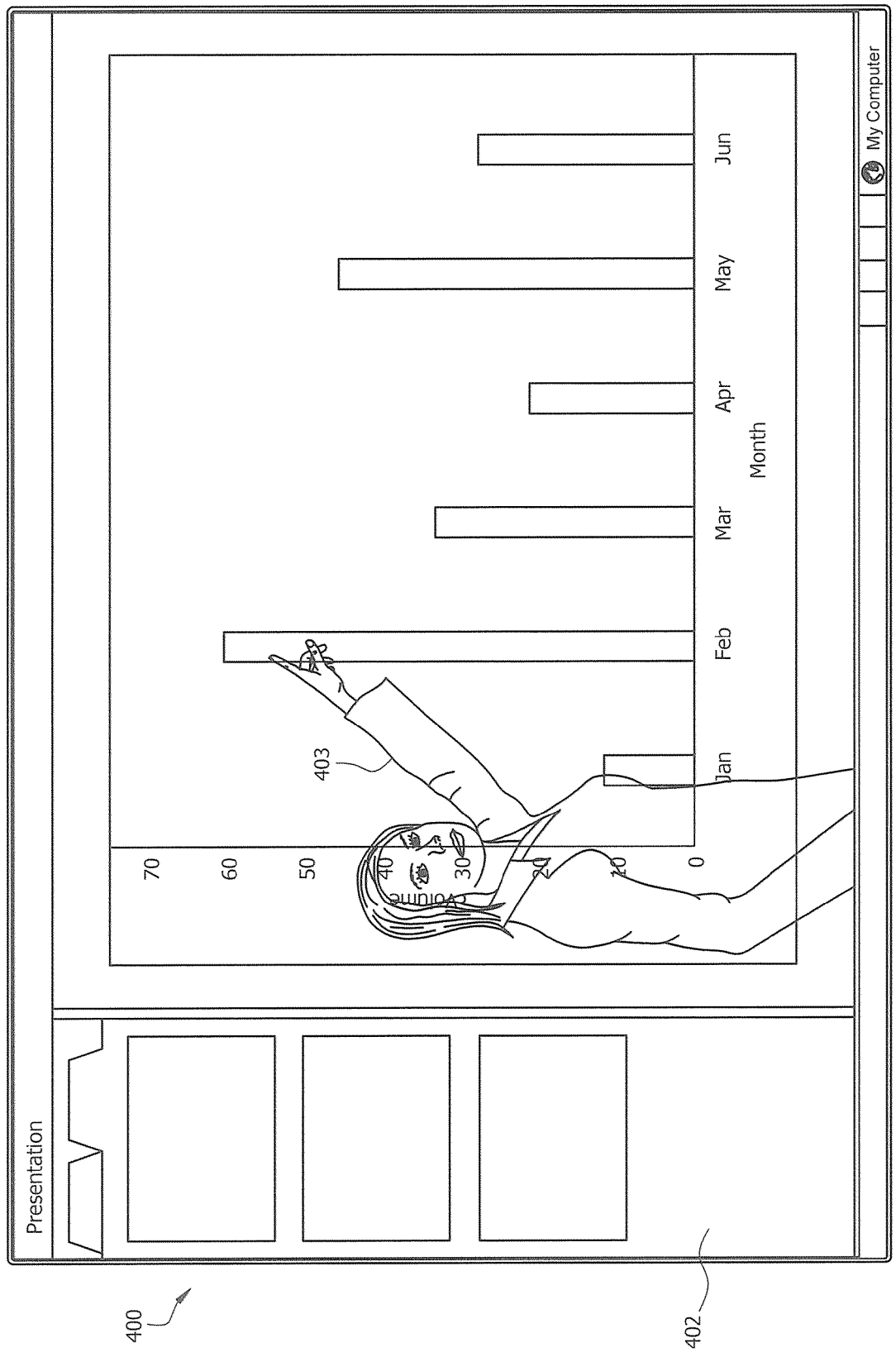
FIG. 4B is an illustration of a blended view of a camera feed and primary feed in accordance with an embodiment of the present teachings.

FIGS. 4A and 4B illustrate blended view 400 of camera feed 403 and primary feed 402 according to an embodiment of the present teachings. Blended feed 400 combines both primary feed 402 and camera feed 403. Blending may be accomplished using any means capable of combining such images including alpha compositing, image masks, and the like. As shown in FIGS. 4A and 4B, the blended feeds are able to be viewed in a manner such that a viewer is able to focus on an application from primary feed 402 while viewing gestures and actions occurring in camera feed 403. Thereby, a greatly improved viewing experience is created.

It should be noted that, while FIG. 4A illustrates a view of a computer desktop for primary feed 402, as stated above, primary feed 402 or additional and/or alternative embodiments of the teachings herein may include any visual presentation that a user may want to view along with the camera feed such as a streaming video feed, and the like. For example, FIG. 4B illustrates camera feed 403 blended with primary feed 402, which is a full screen professional presentation such as is generated by various presentation software.

In some embodiments, when blending primary feed 402 and camera feed 403, it is preferable to reverse the visual presentation of either primary feed 402 or camera feed 403. This is because primary feed 402 is showing the desktop as is, whereas video capturing a scene including a person will generally reverse its visual presentation left to right. For example, even though the video subject points to his or her right, the presentation of that video shows the subject pointing to his or her left. As such, to create a natural viewing environment it is beneficial to reverse one of the feeds. It is generally more natural to reverse camera feed 401 so as to avoid reversal of any words displayed on primary feed 402.

Embodiments of the present disclosure are also configured to adjust a transparency value of one of the feeds. FIGS. 4A and 4B illustrate blended primary feed 402 and camera feed 403 wherein camera feed 403 has had its transparency value adjusted either at specific times or all of the time to become more transparent with respect to primary feed 402. As a result, a person displayed on camera feed 403 is able to gesture in a manner that intersects objects displayed in primary feed 402 without completely obscuring such objects. The added transparency of camera feed 403 also allows an observer of blended view 400 to more easily focus on the content of both primary feed 402 and camera feed 403.

In some embodiments of the present teachings, when adjusting the transparency levels, it may be desirable to only allow transparency adjustments in portions where overlapping of objects within the separate feeds occurs. For example, in the embodiment shown in FIG. 4A, it may be preferable to allow only those portions of the camera feed that intersect objects of the primary feed (such as programs, menus, and the like) to have transparency adjustments, while the remainder of the camera feed stays opaque. In other embodiments, such as is shown in FIG. 4B, the transparency value of the entire camera feed is adjusted.

In additional or alternative embodiments, transparency levels may be automatically set by a program governing the system or a user may be provided means to manually adjust transparency levels. Example embodiments of manual adjustments may be implemented by presenting a graphic toggle bar to a user, by providing functionality on an input/output device such as a mouse or keyboard to enter or scroll adjustments, and the like.

Adjusting the transparency values of one of the feeds allows for a more natural viewing experience. This is due, at least in part, to the fact that, with an adjusted transparency, a viewer of the blended feed will be able to simultaneously focus on both the subject of the camera feed and the subject of the primary feed; whereas, if both the camera feed and primary feed were opaque, one would cover the other at places of intersection, which would lead to a very distracting viewing experience. In a video conference setting that has a shared desktop as a primary feed, it may be beneficial to adjust the camera feed because it has the effect of allowing a person displayed on the camera feed to gesture to a document or application without completely covering the contents of what is displayed on the primary feed. The decision of which feed will have its transparency adjusted, and the extent of the adjustment, may be determined based on the preferred viewing conditions of the separate feeds, or may be governed by a selection made on a conference server.

The transparency levels may also vary depending on what is being viewed on the respective primary and camera feeds. Various embodiments of the present teachings may have the capability to vary transparency from completely opaque to completely transparent, i.e. from zero percent to one hundred percent transparent. In a video conference setting, transparency adjustments between fifteen percent and forty percent transparent have shown to produce pleasing user viewing experiences.

Figure 4C:
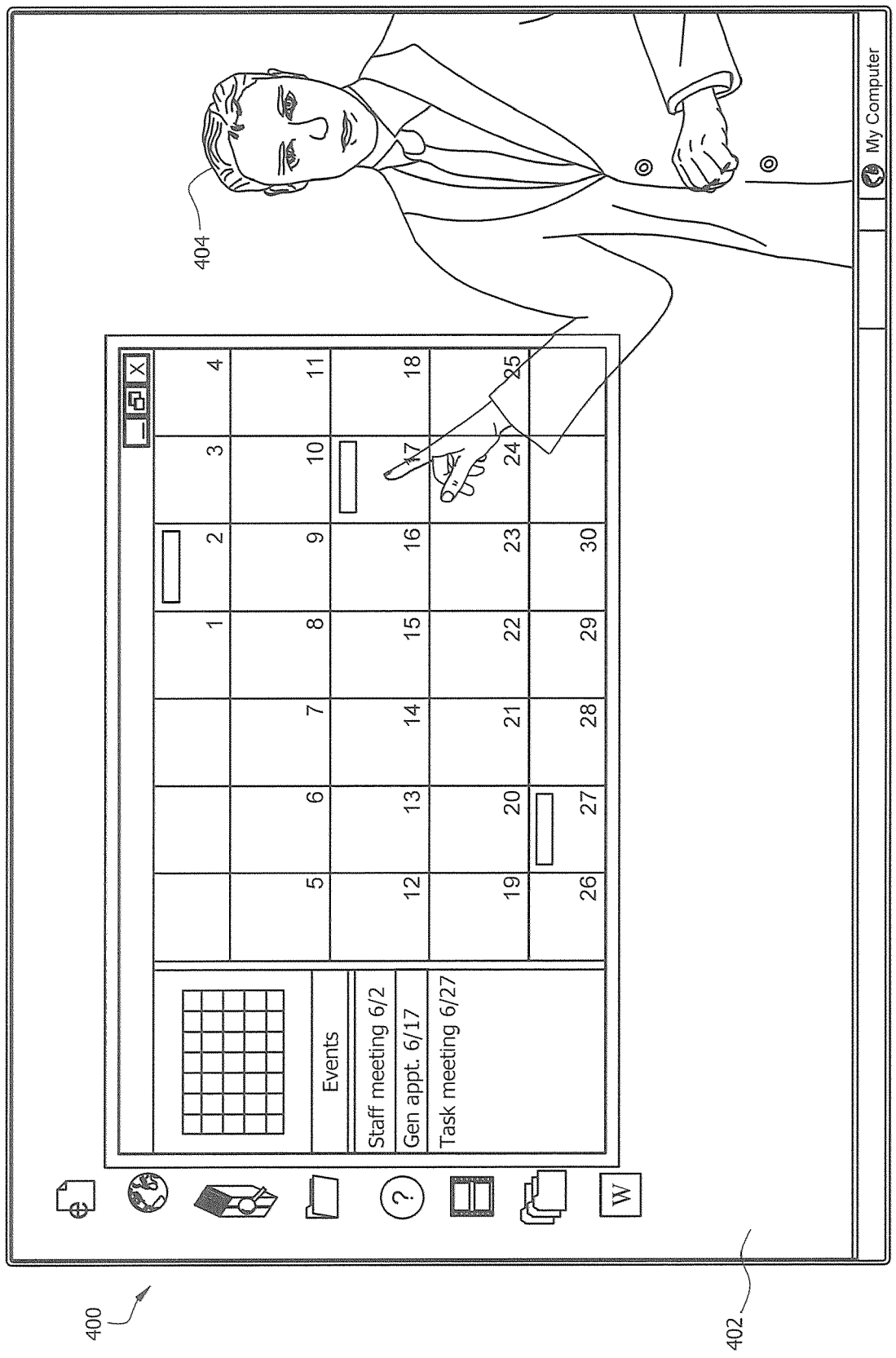
FIG. 4C is an illustration of a blended view of a camera feed and a primary feed which blends a separate user to the view of FIG. 4A in accordance with an embodiment of the present teachings which utilize multiple camera feeds.

Additional embodiments of the present teachings may include implementing the above teachings for a plurality of cameras. For example, in a video conference having multiple participants spread over various locations, embodiments of the present teaching could identify and subtract reference frames from multiple camera feed data captures. Each such camera feed data capture is the stream of image data captured by the camera of the multiple participants. In embodiments having multiple camera feeds, it may still be preferable to only display one such feed at any given time. FIG. 4C is an illustration of the embodiment of FIG. 4A having a blended view 400 of separate camera feed 404 and primary feed 402 where separate camera feed 404 one of a plurality of camera feeds. Embodiments utilizing multiple camera feed data captures may be configured to switch between camera feeds, e.g. camera feed 401 and separate camera feed 404, to be blended with primary feed 402 based on activity within the video conference such as when a user at separate feed 404 is speaking, or when a administrator selects a separate feed.

Figure 5A:
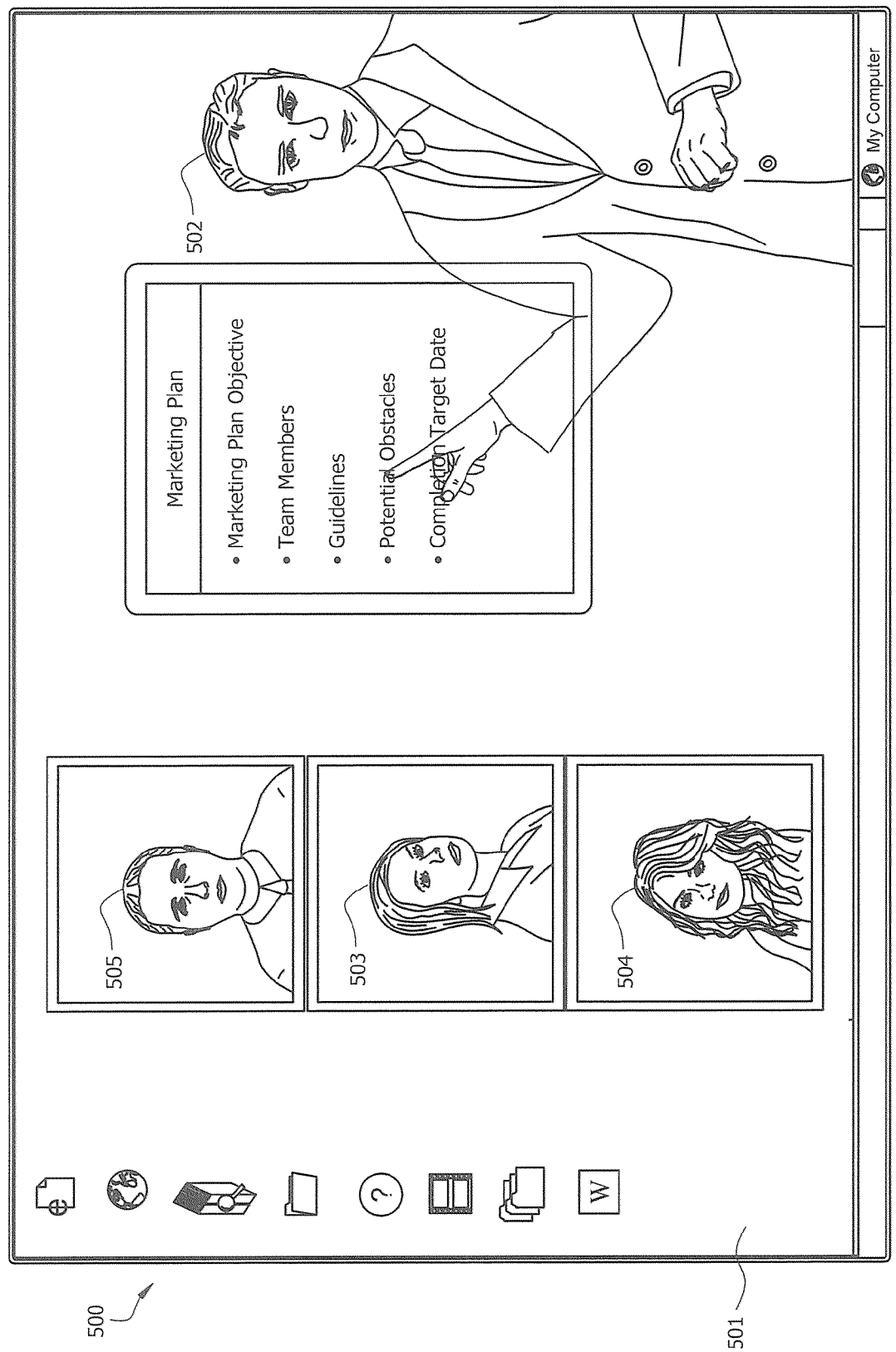
FIGS. 5A and 5B are illustrations of an embodiment of the present teachings which utilize multiple camera feeds.
Figure 5B:
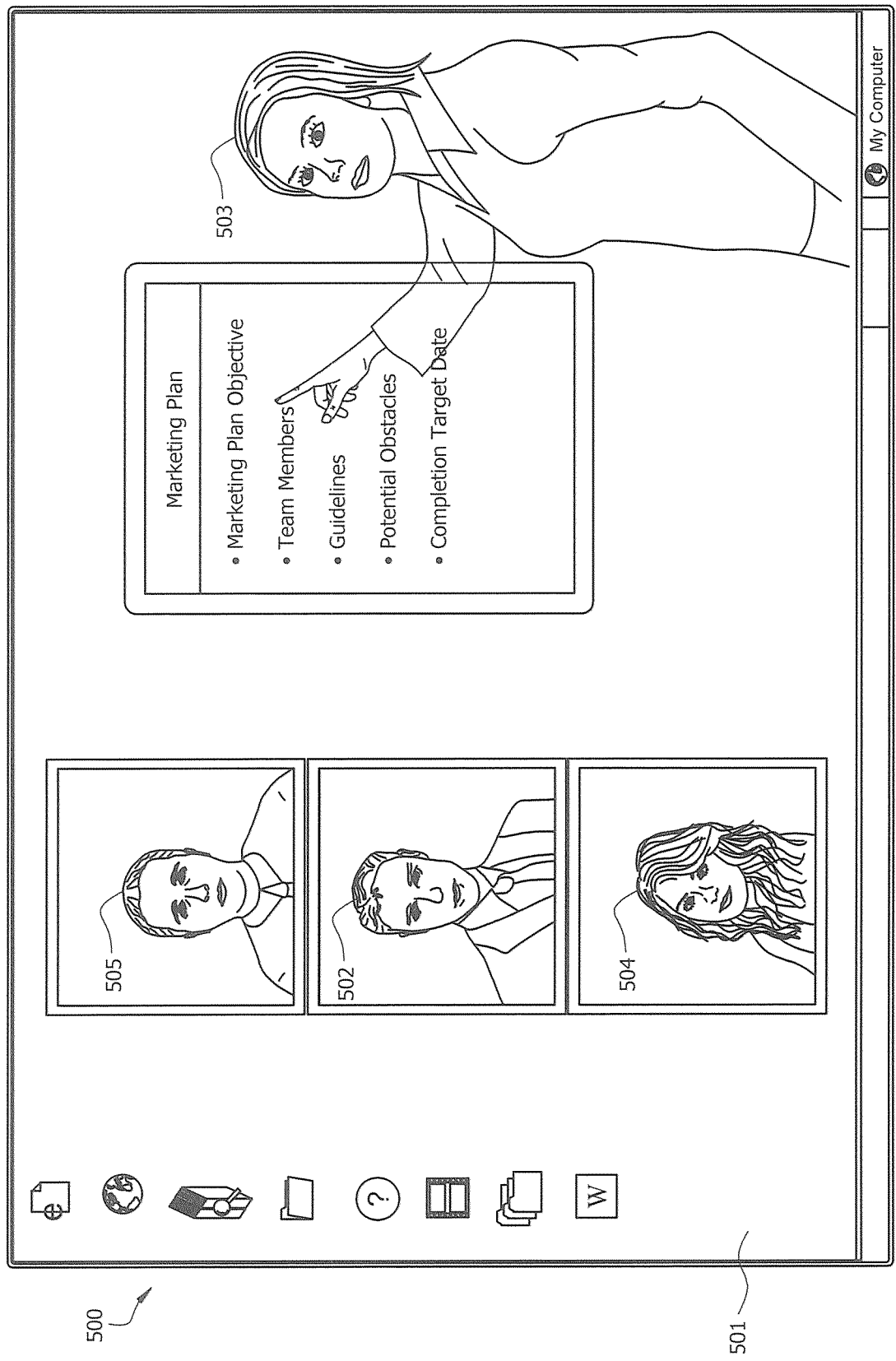

FIGS. 5A and 5B are additional blended illustrations 500 of an embodiment of the present teachings which utilize and blend multiple camera feeds. Multiple camera feeds 502 503 504 505 may be simultaneously blended with primary feed 501 thereby showing multiple conference participants. As shown in FIG. 5A, camera feed 502 is active and is displayed in a blended view with primary feed 501. In FIG. 5B a second camera feed 503 of multiple camera feeds 502 503 504 505 is active and displayed in a blended view with primary feed 501. A feed of multiple camera feeds 502 503 504 505 may become active based on activity within the video conference. For example, camera feed 502 may become active when a user associated with camera feed 502 is speaking. In other embodiments, an active feed may be selected manually. It may also be desirable to provide an indicator proximate to inactive feeds (e.g. 503 504 505 if FIG. 5A) to indicate when a participant desires to speak, or is speaking. Additionally, as shown in FIGS. 5A and 5B embodiments may function to expand the viewable size, or reposition, a camera feed of multiple camera feeds 502 503 504 505, in response a particular feed becoming active. When displaying multiple participants, embodiments may provide for an indicator to signal which participant is speaking.

Figure 6:
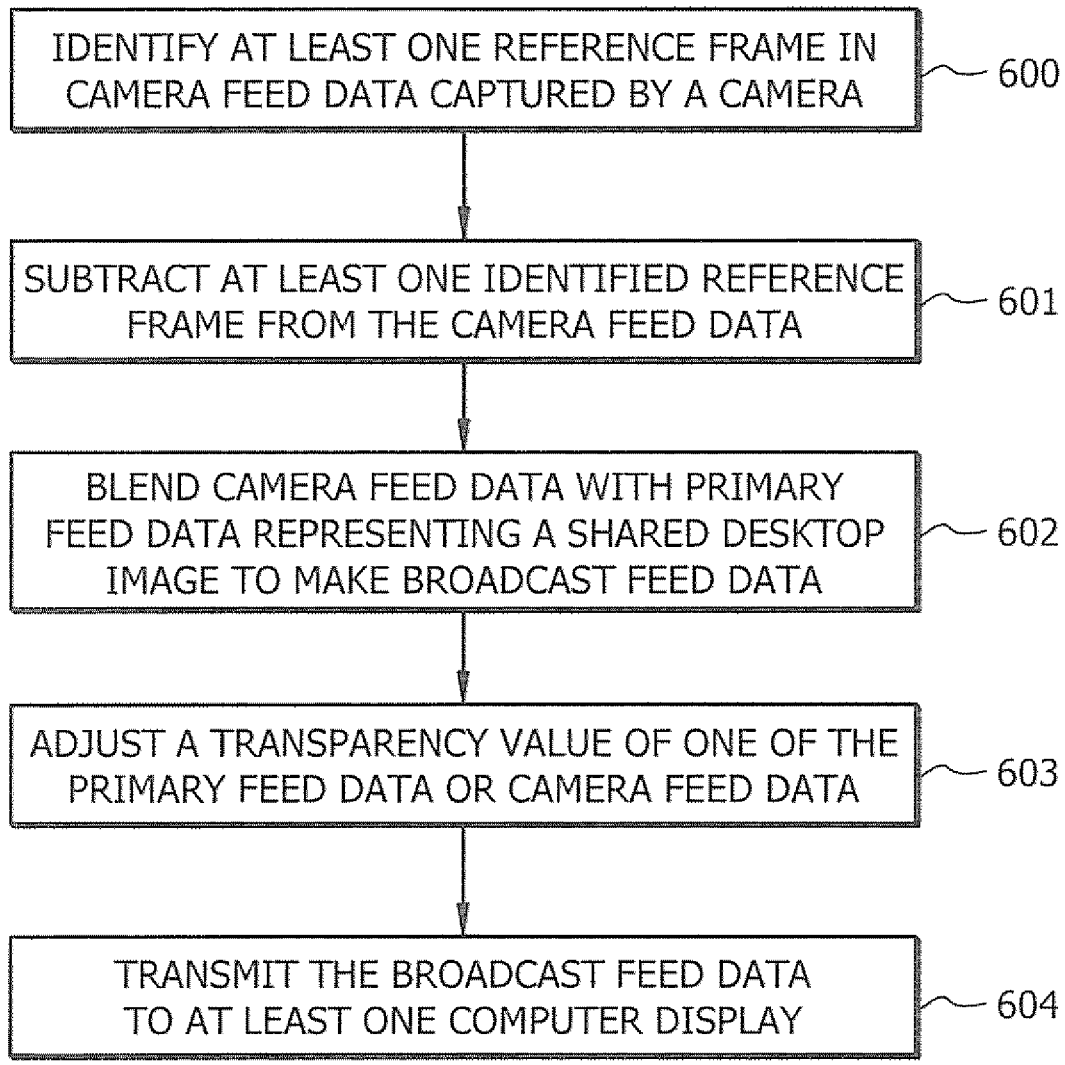
FIG. 6 is a flowchart illustrating example steps executed to implement an embodiment of the present teachings.

FIG. 6 is a flowchart illustrating example steps executed to implement an embodiment of the present teachings. In step 600, at least one reference frame in camera feed data captured by a first camera is identified. The identification of a reference frame may be accomplished at the location of the camera by using various different methods. For example, a computer configured to accept a signal from the camera which is capable of processing the video signal, or identification of a reference frame may be implemented remotely with respect to the camera at a video conference server, at a video conference participant's computer, and the like.

In step 601, at least one of the identified reference frames in the camera feed data is subtracted from the camera feed data which will then be blended with a primary feed, representing a shared computer desktop image. As with the identification step, subtraction of a reference frame may be accomplished at the location of the camera by using, for example, a computer configured to accept a signal from the camera which is capable of processing the video signal. Further, subtraction of a reference frame may be implemented remotely with respect to the camera at a video conference server, at a video conference participant's computer, and the like. As shown in FIG. 2, when reference frame 201 is subtracted from field of view 200, only primary subject 204 remains.

As with the subtraction of the reference frames from the camera feed data, embodiments which subtract at least one reference frame in a primary feed may be implemented at the location of the computer generating the primary feed. Further, subtraction of at least one reference frame may be implemented remotely with respect to the computer generating the primary feed. For example, the reference frames may be subtracted at a video conference server, at a video conference participant's computer, and the like.

In step 602, a primary feed is retrieved for the collaboration. The primary feed may originate from any local or remote source with respect to a viewer of the primary feed. The primary feed may be a shared desktop or presentation or portion thereof, an application, slide show, recorded or streaming video feed, or any other type of feed or multimedia presentation which would be desirable to blend with a camera feed. Further, the primary feed may originate locally or remotely with respect to the camera feed.

In step 603, a transparency value of at least one of the camera feed or the primary feed is adjusted. Transparency adjustments can be made in any manner, such as the techniques described above. Further, transparency adjustments may be made locally by individual viewers of the feeds, or may be done centrally by an administrator or at a conferencing or blending server, or may be done at the receivers locations individually. After setting the transparency, the camera feed is blended with a primary feed, in step 604, to make a composite broadcast feed.

In step 605, the composite broadcast feed data is transmitted to at least one computer display. This transmission can take place in a system such as is illustrated in FIG. 1. The transmission can be local such as on local computer 101, or can be made over network medium 100 to remote locations such as to nodes 102*a-n*.

Figure 7:
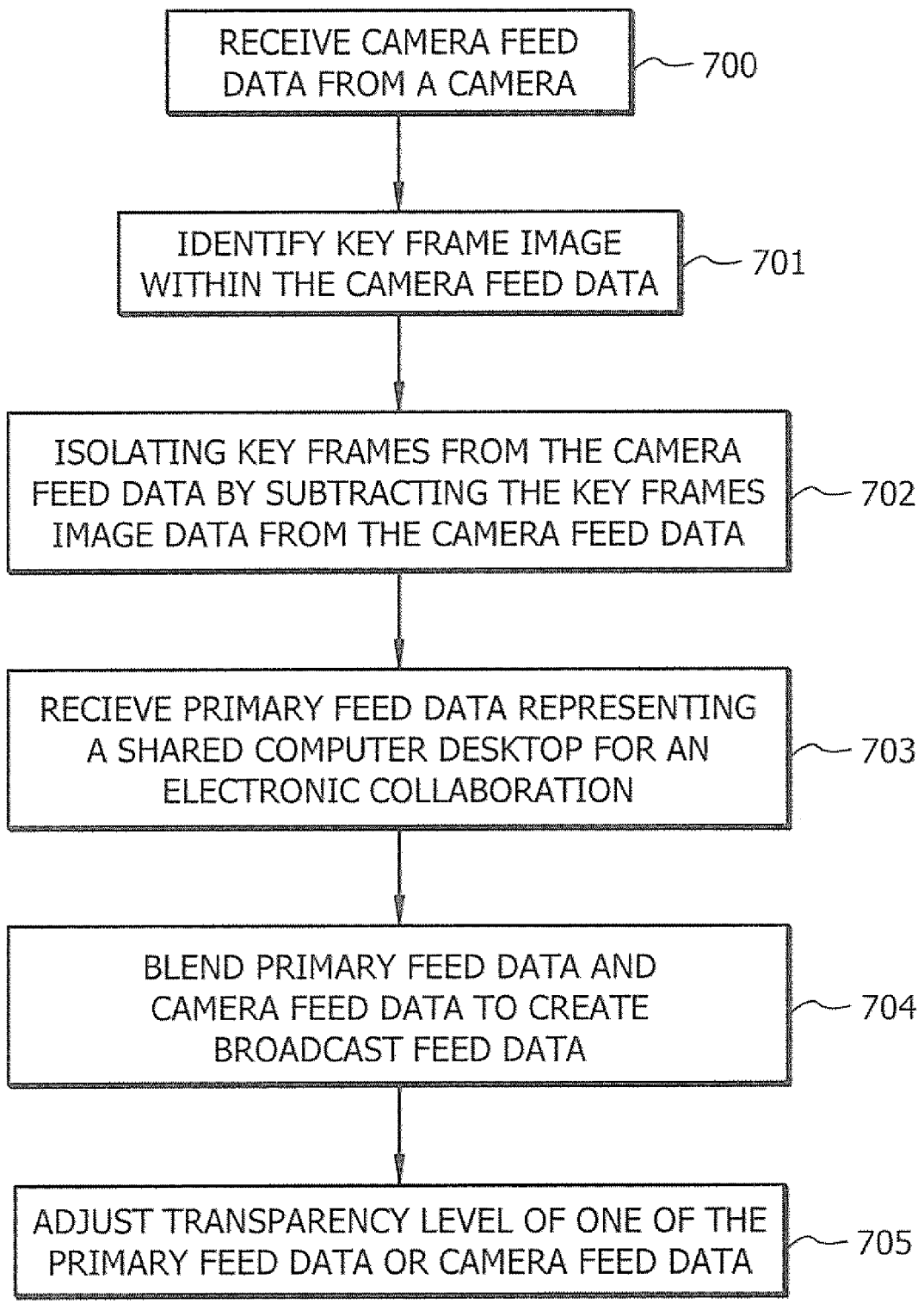
FIG. 7 is a flowchart illustrating example steps executed to implement an embodiment of the present teachings.

FIG. 7 illustrates an alternative flowchart illustrating example steps executed to implement an embodiment of the present teachings. In step 700, camera feed data from a camera is received. Step 701 includes identifying a key frame image within the camera feed data. This key frame image is then isolated or subtracted from the camera feed data in step 702. A primary feed is also received, in step 703, which comprises a visual representation of the shared space, which may be a shared desktop or presentation or portion thereof, an application, slide show, recorded or streaming video feed, or any other type of feed or multimedia presentation which would be desirable to blend with a camera feed. In step 704, a transparency level of at least one of the camera feed or primary feed is adjusted. Further, the camera feed data is blended with the primary feed data to create a broadcast feed data in step 705.

It is noted that one or both of the camera feed data and primary feed data may originate in separate locations. Further, the camera feed data and primary feed data may both be received from separate remote sources before blending occurs. Additionally, once the broadcast feed is formed it may be transmitted to one or more participants in a video conference.

While methods and processes in the present disclosure have been described in terms of steps and flowcharts, it is noted the methods and processes of the present disclosure may be undertaken in various sequential orders and are not limited by the exemplary embodiments described herein. For example, transparency adjustments may be made to separate feeds before, during, or after blending processes. Further, different feeds may be transmitted and received in various order, or simultaneously, depending on different embodiments.

Embodiments, or portions thereof, may be embodied in program or code segments operable upon a processor-based system (e.g., computer system or computing platform) for performing functions and operations as described herein. The program or code segments making up the various embodiments may be stored in a computer-readable medium, which may comprise any suitable medium for temporarily or permanently storing such code. Examples of the computer-readable medium include such tangible computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Embodiments, or portions thereof, may be embodied in a computer data signal, which may be in any suitable form for communication over a transmission medium such that it is readable for execution by a functional device (e.g., processor) for performing the operations described herein. The computer data signal may include any binary digital electronic signal that can propagate over a transmission medium such as electronic network channels, optical fibers, air, electromagnetic media, radio frequency (RF) links, and the like, and thus the data signal may be in the form of an electrical signal, optical signal, radio frequency or other wireless communication signal, etc. The code segments may, in certain embodiments, be downloaded via computer networks such as the Internet, an intranet, a local area network (LAN), a metropolitan area network (MAN), a wide area network (WAN), the public switched telephone network (PSTN), a satellite communication system, a cable transmission system, and/or the like.

Figure 8:
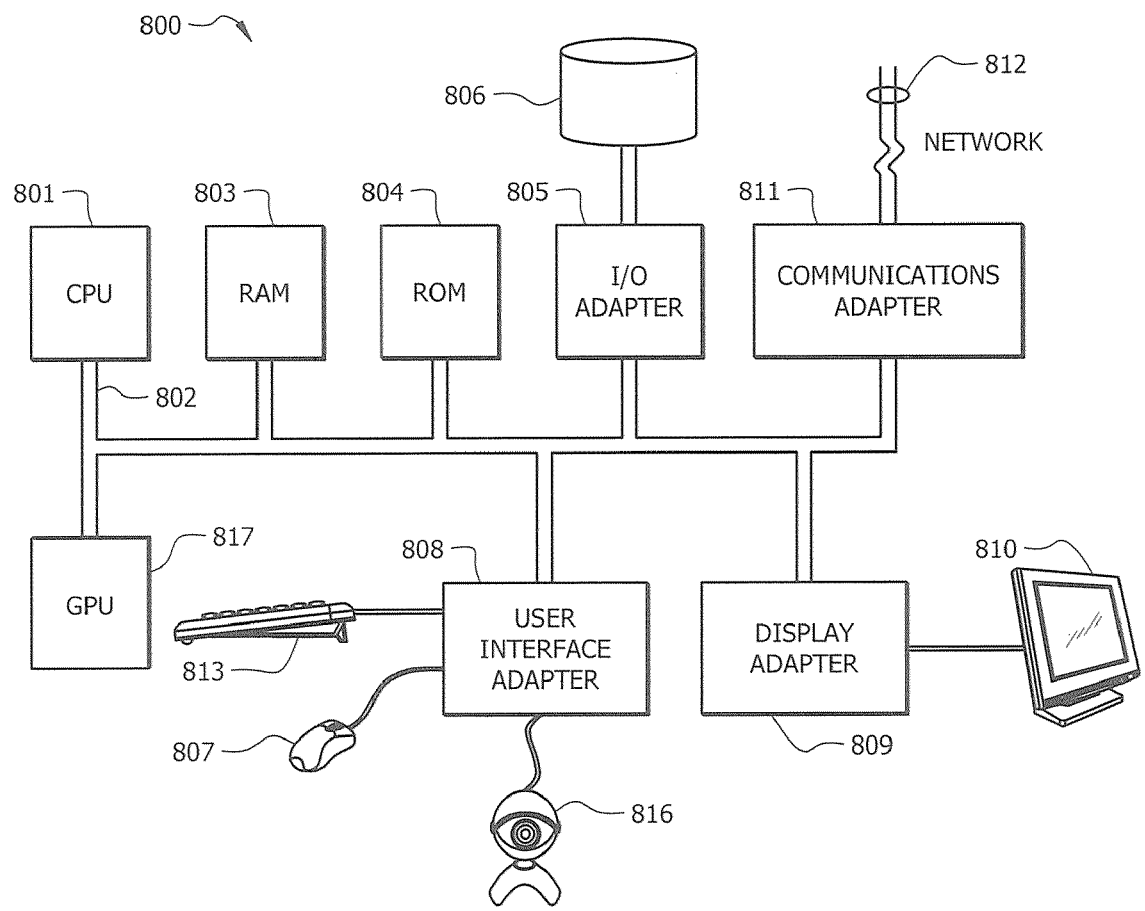
FIG. 8 is a block diagram illustrating a computer system which is adapted in accordance with an embodiment of the present teachings.

FIG. 8 illustrates an exemplary computer system 800 which may be employed to implement the broadcast servers and operations therein according to certain embodiments. Central processing unit (CPU) 801 is coupled to system bus 802. CPU 801 may be any general-purpose CPU. The present disclosure is not restricted by the architecture of CPU 801 (or other components of exemplary system 800) as long as CPU 801 (and other components of system 800) supports the inventive operations as described herein. CPU 801 may execute the various logical instructions described herein. For example, CPU 801 may execute machine-level instructions according to the exemplary operational flow described above in conjunction with FIGS. 6 and 7. When executing instructions representative of the operational steps illustrated in FIGS. 6 and 7, CPU 801 becomes a special-purpose processor of a special purpose computing platform configured specifically to operate according to the various embodiments of the teachings described herein.

Computer system 800 also includes graphics processing unit (GPU) 817, which provides a separate graphics card or on-board graphics processing for performing specialized high speed graphics processing, such as the reversal, transparency, and blending processes described herein.

Computer system 800 also includes random access memory (RAM) 803, which may be SRAM, DRAM, SDRAM, or the like. Computer system 800 includes read-only memory (ROM) 804 which may be PROM, EPROM, EEPROM, or the like. RAM 803 and ROM 804 hold user and system data and programs, as is well known in the art.

Computer system 800 also includes input/output (I/O) adapter 805, communications adapter 811, user interface adapter 808, and display adapter 809. I/O adapter 805, user interface adapter 808, and/or communications adapter 811 may, in certain embodiments, enable a user to interact with computer system 800 in order to input information.

I/O adapter 805 connects to storage device(s) 806, such as one or more of hard drive, compact disc (CD) drive, floppy disk drive, tape drive, etc., to computer system 800. The storage devices are utilized in addition to RAM 803 for the memory requirements associated with performing the operations described herein. Communications adapter 811 is adapted to couple computer system 800 to network 812, which may enable information to be input to and/or output from system 800 via such network 812 (e.g., the Internet or other wide-area network, a local-area network, a public or private switched telephony network, a wireless network, any combination of the foregoing). User interface adapter 808 couples user input devices, such as keyboard 813, pointing device 807, and microphone 814 and/or output devices, such as speaker(s) 815 to computer system 800. Display adapter 809 is driven by CPU 801 to control the display on display device 810. Display adapter 809 transmits instructions for transforming or manipulating the state of the various numbers of pixels used by display device 810 to visually present the desired information to a user. Such instructions include instructions for changing state from on to off, setting a particular color, intensity, duration, or the like. Each such instruction makes up the rendering instructions that control how and what is displayed on display device 810.

It shall be appreciated that the present disclosure is not limited to the architecture of system 800. Any suitable processor-based device may be utilized for implementing embodiments of the present disclosure, including without limitation personal computers, laptop computers, computer workstations, multi-processor servers, and even mobile telephones. Moreover, certain embodiments may be implemented on application specific integrated circuits (ASICs) or very large scale integrated (VLSI) circuits. In fact, persons of ordinary skill in the art may utilize any number of suitable structures capable of executing logical operations according to the embodiments.

It is noted that the above disclosure is primarily focused on video conferencing embodiments. These examples are made for the sake of illustration and are not meant to be limiting. The principles of the present disclosure are useful in various other settings. For example, in classroom setting or a lecture setting, a lecturer may have a slideshow, a movie, or something else that is electronically controllable. In such a setting it may be preferable to eliminate other menus, icons and the like, in order to have a full screen mode for the primary desktop. Further, a user may want to have a secondary feed such as an active window or a movie blended with the primary desktop and set aside in a manner that it is readily accessible when desired.

Although the present teaching and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present teachings, processes, machines, manufacture, compositions of matter, means, methods, or steps, presently existing or later to be developed that perform substantially the same function or achieve substantially the same result as the corresponding embodiments described herein may be utilized according to the present teachings. Accordingly, the appended claims are intended to include within their scope such processes, machines, manufacture, compositions of matter, means, methods, or steps.

In the foregoing detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the foregoing detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

What is claimed is:

1. A computer implemented method comprising:
   identifying image data representing at least one reference frame in camera feed data captured by a first camera;
   subtracting said image data representing said at least one identified reference frame from said camera feed data to be blended with primary feed data representing a shared desktop space for a visual collaboration;
   adjusting a transparency value of at least one of said camera feed data and said primary feed data, wherein said adjusting said transparency value further comprises altering said transparency value of a portion of one of said camera feed data or primary feed based on an overlapping of said camera feed data or primary feed data with respect to the other;
   blending said camera feed data with said primary feed data to make a broadcast feed; and
   transmitting said broadcast feed to at least one computer display.

2. The computer implemented method of claim 1 further comprising subtracting image data representing at least one primary reference frame from said primary feed data.

3. The computer implemented method of claim 2 wherein said subtracting at least one primary reference frame includes subtracting a background picture from said primary feed data.

4. The computer implemented method of claim 2 wherein said subtracting at least one primary reference frame includes subtracting one or more program icons from said primary feed data.

5. The computer implemented method of claim 1 further comprising reversing a visual presentation of said camera feed data.

6. The computer implemented method of claim 1 further comprising:
   identifying image data representing at least one additional reference frame in additional camera feed data captured by each of a plurality of additional cameras; and
   subtracting out said image data representing said at least one reference frame from each of said corresponding camera feed data.

7. The computer implemented method of claim 6 further comprising blending said camera feed data with said primary feed.

8. The computer implemented method of claim 6 further comprising switching between ones of said camera feed data associated with ones of said plurality of additional cameras to be blended with said primary feed based on activity within said visual collaboration.

9. The computer implemented method of claim 1 wherein said transparency value is adjusted to be within a range of 15 to 40 percent transparent.

10. The computer implemented method of claim 1 further comprising receiving user input identifying adjustments to said transparency value of at least one of said camera feed data and said primary feed data.

11. The computer implemented method of claim 1 wherein said primary feed data is one of:

a shared desktop in said visual collaboration;
a selected portion of said shared desktop;
a shared application;
a multimedia presentation; and
an active video feed.

12. The computer implemented method of claim 1 wherein said identifying said image data representing said at least one reference frame is performed automatically.

13. The computer implemented method of claim 1 wherein said transparency value is only altered for the overlapping.

14. The computer implemented method of claim 1 wherein said primary feed data originates from one of:
a remote location; and
a local desktop.

15. The computer implemented method of claim 1 wherein said subtracting is implemented at a location of one:
said camera;
a computer local to said camera;
a conferencing server;
a blending server; and
one or more participant computers.

16. The computer-implemented method of claim 1, wherein:
said identifying is performed on a first computing device; and
said subtracting is performed on a second computing device.

17. A video conferencing system comprising:
a local computer, said local computer configured to receive a video signal from a remote computer, said local computer further configured to adjust a transparency level of at least one of a primary feed signal and said video signal, said primary feed signal representing image data of a desktop displayed on said local computer, wherein said local computer is configured to dynamically adjust said transparency level of at least one of said video signal and said primary feed signal, and wherein said local computer is further configured to blend said video signal with said primary feed signal, wherein the blended signal incorporates one or more primary subjects of said video signal with said primary feed signal.

18. The video conferencing system of claim 17 wherein said local computer is configured to receive said primary feed signal from a remote computer.

19. The video conferencing system of claim 17 wherein said local computer is configured to broadcast said blended signal to one of:
one or more remote computers; and
a conferencing server.

20. The video conferencing system of claim 17 wherein said local computer is configured to isolate said one or more primary subjects of said video signal from the entirety of said video signal.

21. The video conferencing system of claim 17 wherein said local computer is configured to subtract image data representing at least one reference frame from raw image data of said primary feed signal.

22. The video conferencing system of claim 17 wherein said local computer is configured to reverse a visual presentation of said video signal.

23. The video conferencing system of claim 17 further comprising:
one or more additional cameras;
one or more additional computers each associated with a corresponding one of said one or more additional cameras, wherein said one or more additional computers are configured to identify image data representing one or more primary subjects in one or more additional camera feed signals captured by said one or more additional cameras, and wherein said one or more additional computers are configured to generate one or more additional camera feed signals by isolating out said image data representing one or more primary subjects from an entirety of said video signal.

24. The video conferencing system of claim 23 wherein said one or more additional computers are further configured to blend said one or more additional camera feed signals with said primary feed signal.

25. The video conferencing system of claim 23 wherein said video conferencing system is configured to switch between ones of said one or more additional camera feed signals to be blended with said primary feed based on activity within said visual collaboration.

26. The video conferencing system of claim 17 wherein said local computer is further configured to allow a user to dynamically adjust said transparency level of at least one of said video signal and said primary feed signal.

27. The video conferencing system of claim 17 wherein said local computer is configured to adjust said transparency level of said video signal on a portion of said video signal based on an overlapping of said video feed with said primary feed signal.

28. A computer implemented method comprising:
receiving camera feed data from a video source;
identifying a key frame image within said camera feed data;
transforming said camera feed data by removing said key frame image;
receiving primary feed data comprising a visual representation of a shared computer desktop space for a visual collaboration;
adjusting a transparency of at least one of said camera feed data and said primary feed data, wherein the transparency is adjusted for only an overlapping portion of said camera feed data and said primary feed data; and
blending said camera feed data with said primary feed data to create composite broadcast data.

29. The computer implemented method of claim 28 wherein said camera feed data and said primary feed data are received from different remote sources.

30. The computer implemented method of claim 28 further comprising broadcasting said composite broadcast data to one or more participants in said visual collaboration.

31. The computer implemented method of claim 28 further comprising:
identifying at least one additional key frame image within one or more separate camera feed data captures from one or more additional cameras; and
isolating said at least one additional key frame image from said one or more separate camera feed data captures.

32. The computer implemented method of claim 31 further comprising blending said one or more separate camera feed data captures with said primary feed data.

33. The computer implemented method of claim 31 further comprising switching between cameras of said one or more additional cameras to be blended with said primary feed data based on activity within said visual collaboration.

34. A computer program product having a non-transitory computer readable media with computer program logic recorded thereon, said computer program product comprising:
code for identifying image data representing at least one reference frame in camera feed data captured by a first camera;

code for transforming said camera feed data by subtracting said at least one reference frame;

code for adjusting a transparency value of at least one of: said camera feed data and primary feed data representing a shared desktop space for a visual collaboration based on an overlapping of said camera feed data with said primary feed data; and code for blending said camera feed data with said primary feed data.

35. The computer program product of claim 34 further comprising code for subtracting at least one primary reference frame in said primary feed data.

36. The computer program product of claim 35 wherein said code for subtracting at least one primary reference frame includes code for subtracting a background picture of said primary feed data.

37. The computer program product of claim 35 wherein said code for subtracting at least one primary reference frame includes code for subtracting one or more program icons from said primary feed data.

38. The computer program product of claim 34 further comprising code for reversing a visual presentation of said camera feed data.

39. The computer program product of claim 34 further comprising:

code for identifying at least one additional reference frame in one or more separate camera feed data captures from one or more additional cameras; and code for subtracting out said at least one additional reference frame from said one or more separate camera feed data captures.

40. The computer program product of claim 39 further comprising code for blending said one or more separate camera feed data captures with said primary feed data.

41. The computer program product of claim 39 further comprising code for switching between ones of said one or more separate camera feed data captures to be blended with said primary feed data based on activity within a visual collaboration.

42. The computer program product of claim 34 wherein said transparency of said camera feed data is adjusted to be between 15 and 40 percent transparent.

43. The computer program product of claim 34 further comprising code for receiving user input dynamically adjusting said transparency value of at least one of said camera feed data and said primary feed data.

44. The computer program product of claim 34 wherein said primary feed data is one of:
a shared desktop in a visual collaboration;
a selected portion of said shared desktop;
a shared application;
a multimedia presentation; and
an active video feed.

45. The computer program product of claim 34 wherein said code for identifying image data representing at least one reference frame is executed automatically.

46. The computer program product of claim 34 wherein said code for adjusting said transparency value of at least one of said camera feed data and said primary feed data further comprises:
code for modifying said transparency value of only the overlapping of said camera feed data with said primary feed data.

47. The computer program product of claim 34 wherein said primary feed data originates from one of:
a remote location; and
a local desktop.

48. The computer program product of claim 34 wherein said subtracting is implemented at a location of one:
said camera;
a computer local to said camera;
a conferencing server;
a blending server; and
one or more participant computers.

49. A computer implemented method comprising:
executing instructions on a computing platform so that binary digital electronic signals identify image data representing at least one reference frame in camera feed data captured by a first camera;

executing instructions on said computing platform so that binary digital electronic signals transform said camera feed data by subtracting said at least one reference frame;

executing instructions on said computing platform so that binary digital electronic signals adjust a transparency value of at least one of: said camera feed data and primary feed data representing a shared desktop space for a visual collaboration, wherein the transparency value is adjusted for only an overlapping portion of said camera feed data and primary feed data; and executing instructions on said computing platform so that binary digital electronic signals blend said camera feed data with said primary feed data.

\* \* \* \* \*